(12) United States Patent
Imura

(10) Patent No.: US 8,419,006 B2
(45) Date of Patent: Apr. 16, 2013

(54) PAPER AUTOMATIC-FEEDING APPARATUS, COPYING MACHINE AND FACSIMILE APPARATUS

(75) Inventor: Wataru Imura, Shizuoka (JP)

(73) Assignee: NEC Access Technica, Ltd., Shizuoka (JP)

( * ) Notice: Subject to any disclaimer, the term of this patent is extended or adjusted under 35 U.S.C. 154(b) by 0 days.

(21) Appl. No.: 13/198,332

(22) Filed: Aug. 4, 2011

(65) Prior Publication Data
US 2012/0074643 A1 Mar. 29, 2012

(30) Foreign Application Priority Data
Sep. 24, 2010 (JP) ................. 2010-214209

(51) Int. Cl.
*G03G 21/00* (2006.01)

(52) U.S. Cl.
USPC ............... 271/3.14; 399/124; 399/125

(58) Field of Classification Search .......... 271/3.14, 271/273; 399/124, 125
See application file for complete search history.

(56) References Cited

U.S. PATENT DOCUMENTS

| | | | |
|---|---|---|---|
| 4,789,876 A * | 12/1988 | Miyai et al. | 399/108 |
| 5,168,308 A * | 12/1992 | Hiraike et al. | 399/125 |
| 7,212,321 B2 * | 5/2007 | Sugiyama et al. | 358/498 |
| 7,379,700 B2 * | 5/2008 | Iwata | 399/367 |
| 2005/0127598 A1 | 6/2005 | Nagura | |

FOREIGN PATENT DOCUMENTS

| | | |
|---|---|---|
| JP | 3042532 U | 10/1997 |
| JP | 2001354328 A | 12/2001 |
| JP | 2003098767 A | 4/2003 |
| JP | 2005170637 A | 6/2005 |
| JP | 2007217178 A | 8/2007 |
| JP | 2009161281 A | 7/2009 |

OTHER PUBLICATIONS

Japanese Office Action for JP2010-214209 mailed on Aug. 28, 2012.

* cited by examiner

*Primary Examiner* — Luis A Gonzalez

(57) ABSTRACT

A paper automatic-feeding apparatus includes a first paper feeding path through which a paper medium passes; a second paper feeding path which is arranged separately from the first paper feeding path and through which a paper medium passes; a first fulcrum part to support a first chassis, which forms at least a part of the first paper feeding path, as a bearing so that the first chassis can be opened and closed; a second fulcrum part to support a second chassis, which forms at least a part of the second paper feeding path, as a bearing so that the second chassis can be opened and closed; and a fixation part to fix the first chassis and the second chassis so that the first chassis and the second chassis may be in a closed state through the fixation part being fixed on a predetermined fixed part; wherein the predetermined fixed part and the second fulcrum part are formed as a common part.

6 Claims, 4 Drawing Sheets

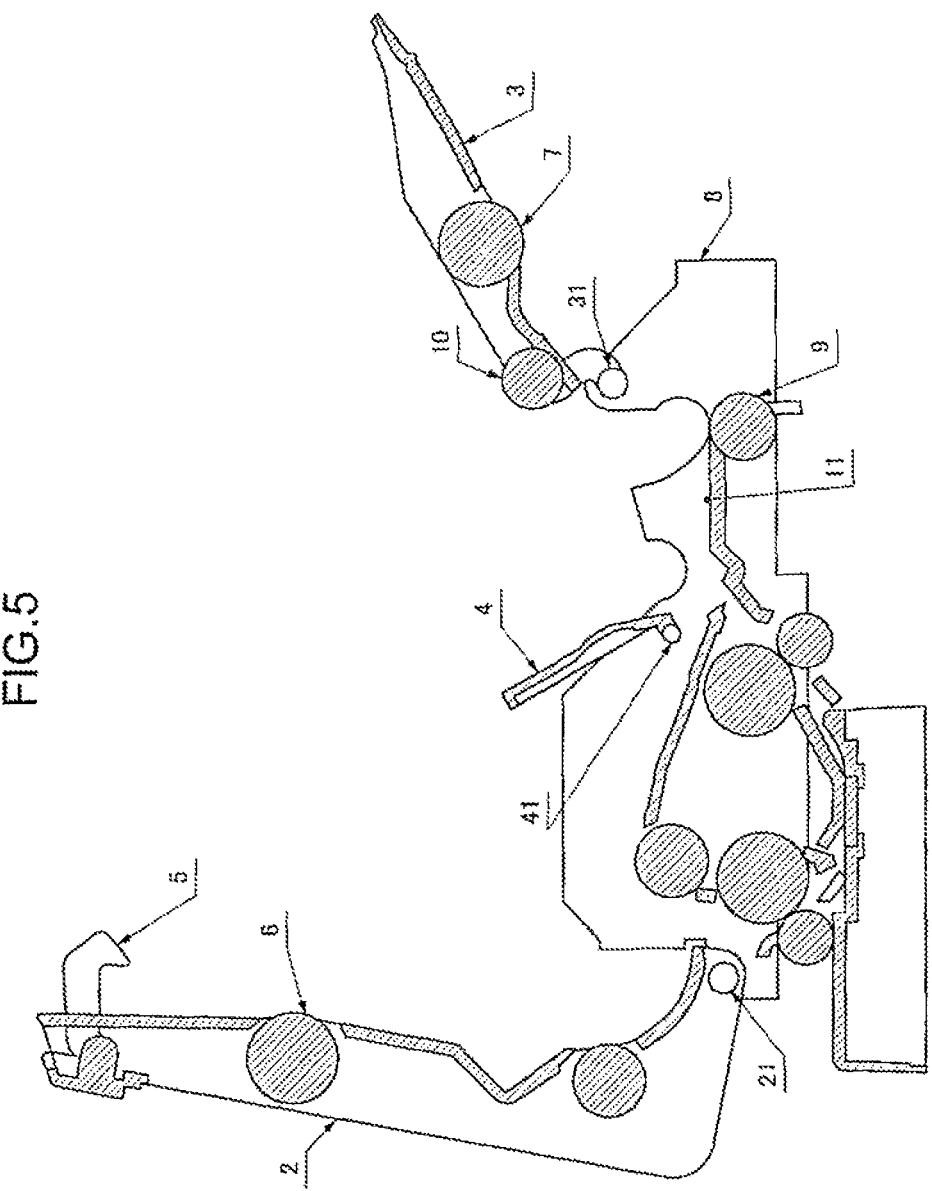

PAPER AUTOMATIC-FEEDING APPARATUS, COPYING MACHINE AND FACSIMILE APPARATUS

INCORPORATION BY REFERENCE

This application is based upon and claims the benefit of priority from Japanese Patent Application No. JP 2010-214209, filed on Sep. 24, 2010, the disclosure of which is incorporated herein in its entirety by reference.

BACKGROUND OF THE INVENTION

1. Technical Field

The present invention relates to a paper automatic-feeding apparatus, a copying machine and a facsimile apparatus which are equipped with a paper automatic-feeding function.

2. Background Art

A paper automatic-feeding apparatus, with which a copying machine, a facsimile apparatus, a scanner apparatus or the like is equipped, becomes miniaturized at the present time. As merit of the miniaturization, it is possible not only to improve product value but also to reduce cost of a component and cost for transporting the component and the product. Moreover, consideration to the environment is cited as one reason for the miniaturization. Since it is estimated strongly for the above-mentioned reason that the paper automatic-feeding apparatus will be miniaturized in future, it is mandatory to mount various mechanisms on the paper automatic-feeding apparatus under condition of saving a space (for example, refer to Japanese Unexamined Patent Application Publication No. JP 2001-354328).

A certain paper automatic-feeding apparatus, with which the copying machine, the facsimile apparatus, the scanner apparatus or the like is equipped, includes a function to read a front side of a manuscript which is put on a manuscript reading glass, and afterward to feed the manuscript on the manuscript reading glass again with turning the manuscript inside out, and then to read a back side of the manuscript.

The function mentioned above is realized, for example, through switching back the manuscript, whose front side is read, on a paper discharging tray and feeding the manuscript on the manuscript reading glass again with turning the manuscript inside out, and then reading the back side of the manuscript.

The above-mentioned paper automatic-feeding apparatus can read both the front side and the back side of the manuscript. However, since a paper feeding path of the above-mentioned paper automatic-feeding apparatus has complicated structure, it occurs often that the manuscript is jammed, in comparison with a case that only one side of the manuscript is read. In order to remove the jammed manuscript, it is necessary to arrange a fulcrum for rotation on each chassis which forms a part of a paper feeding path, and to open and close the paper feeding path through rotating each chassis. Moreover, it is necessary to arrange a lock mechanism in order to fix each chassis, which has the fulcrum for rotation, at a time when the paper automatic-feeding apparatus works.

However, it is requested at the present time to make the paper automatic-feeding apparatus miniaturized furthermore. For this reason, it is impossible to make a space for arranging the fulcrum for rotation and the lock mechanism separately.

SUMMARY

An object of the present invention is to provide a paper automatic-feeding apparatus, a copying machine and a facsimile apparatus which can realize to save a space furthermore with holding a mechanism which is necessary to remove a jammed paper.

A paper automatic-feeding apparatus includes a first paper feeding path through which a paper medium passes; a second paper feeding path which is arranged separately from the first paper feeding path and through which a paper medium passes; a first fulcrum part to support a first chassis, which forms at least a part of the first paper feeding path, as a bearing so that the first chassis can be opened and closed; a second fulcrum part to support a second chassis, which forms at least a part of the second paper feeding path, as a bearing so that the second chassis can be opened and closed; and a fixation part to fix the first chassis and the second chassis so that the first chassis and the second chassis may be in a closed state through the fixation part being fixed on a predetermined fixed part; wherein the predetermined fixed part and the second fulcrum part are formed as a common part.

BRIEF DESCRIPTION OF THE DRAWINGS

Exemplary features and advantages of the present invention will become apparent from the following detailed description when taken with the accompanying drawings in which:

FIG. 5 is an explanatory diagram showing a state that each chassis is opened in order to remove a jammed paper in the paper automatic-feeding apparatus.

EXEMPLARY EMBODIMENT

Exemplary embodiments of the present invention will now be described in detail in accordance with the accompanying drawings.

Figure 1:
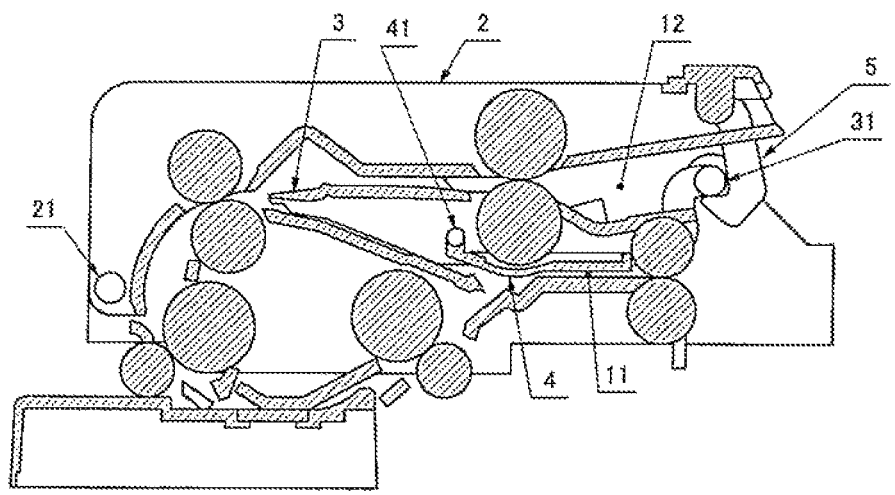
FIG. 1 is an explanatory diagram showing an example of structure of a paper automatic-feeding apparatus according to the present invention.
Figure 2:
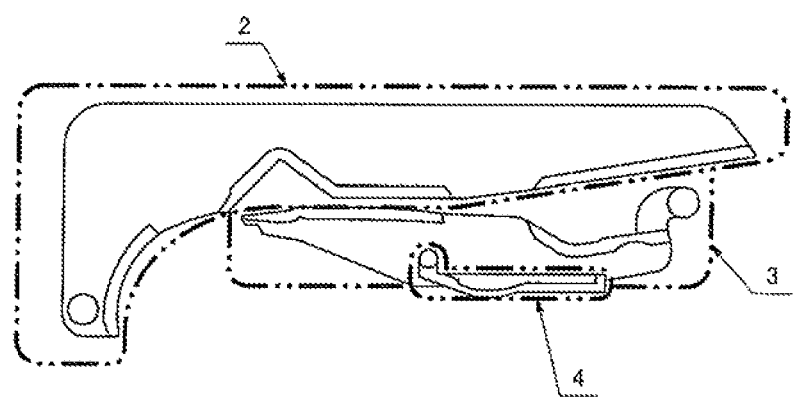
FIG. 2 is an explanatory diagram showing an example of structure of a chassis of the paper automatic-feeding apparatus shown in FIG. 1.
Figure 3:
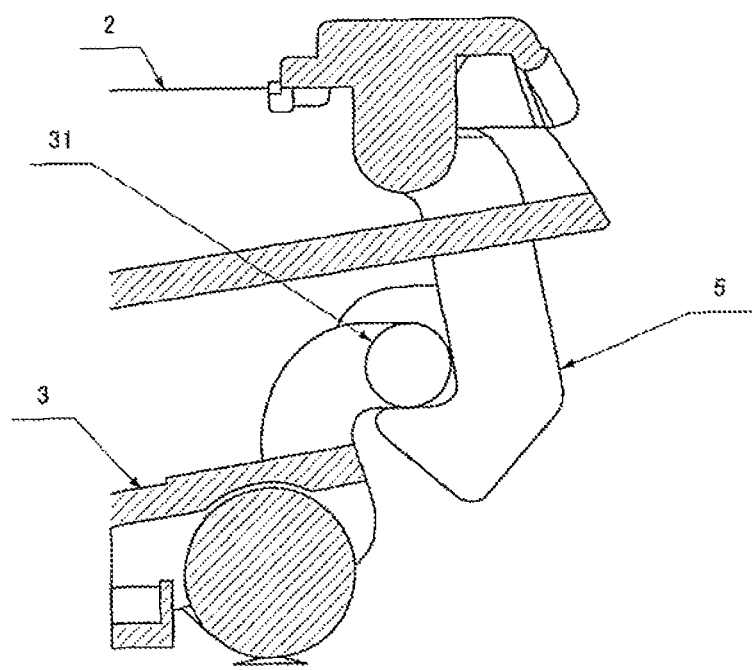
FIG. 3 is an explanatory diagram showing an example of structure of a lock mechanism which is mounted on the paper automatic-feeding apparatus shown in FIG. 1.

Hereinafter, the exemplary embodiment of the present invention will be described with reference to a drawing. FIG. 1 is an explanatory diagram showing an example of structure of a paper automatic-feeding apparatus according to the present invention. FIG. 2 is an explanatory diagram showing an example of structure of a chassis of the paper automatic-feeding apparatus shown in FIG. 1. FIG. 3 is an explanatory diagram showing an example of structure of a lock mechanism which is mounted on the paper automatic-feeding apparatus shown in FIG. 1. The paper automatic-feeding apparatus shown in FIG. 1 is mounted, for example, on a copying machine, a facsimile apparatus and a scanner apparatus.

In the case that a manuscript (that is, a paper) is jammed on a paper feeding path 11 of the paper automatic-feeding apparatus shown in FIG. 1, FIG. 2 and FIG. 3, it is necessary to move a chassis 2, a chassis 3 and a chassis 4, which form a part of the paper feeding path 11, in order to expose the paper feeding path 11.

For this reason, a fulcrum for rotation 21, a fulcrum for rotation 31 and a fulcrum for rotation 41 are arranged on the chassis 2, the chassis 3 and chassis 4 respectively. Each chassis is supported by the fulcrum which works as a bearing. Specifically, the fulcrum supports the chassis so that the chassis can be rotated around the fulcrum. Then, it is possible to expose the paper feeding path 11 through rotating the chassis 2, the chassis 3 and the chassis 4. As mentioned above, it becomes easy to remove the jammed paper through arranging a plurality of chassis which can be opened and closed easily.

Moreover, in order to fix the chassis 2, the chassis 3 and the chassis 4 when the paper automatic-feeding apparatus works, a lock mechanism 5 is mounted on the chassis 2. Moreover, the fulcrum for rotation 31, which is arranged on the chassis 3, is used as a bearing of the lock mechanism 5'. As a result, it is possible to realize to save a space efficiently in comparison with a case that the lock mechanism is arranged on each chassis. That is, according to the exemplary embodiment, one common part is used as the fulcrum for rotation 31 and the bearing of the lock mechanism 4.

Figure 4:
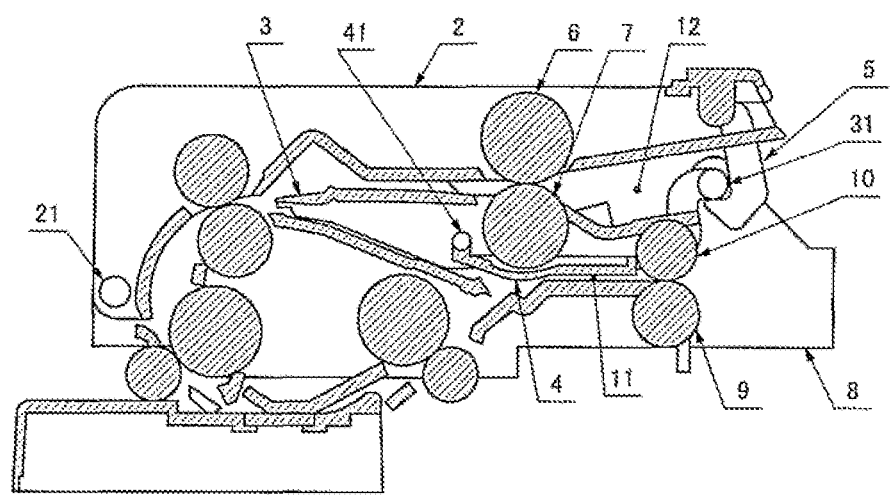
FIG. 4 is an explanatory diagram showing an example of more specific structure of the paper automatic-feeding apparatus shown in FIG. 1.

Next, a more specific example of the paper automatic-feeding apparatus according to the present invention will be described with reference to FIG. 4. FIG. 4 is an explanatory diagram showing an example of more specific structure of the paper automatic-feeding apparatus shown in FIG. 1

As shown in FIG. 4, the paper automatic-feeding apparatus includes the chassis 2, the fulcrum for rotation 21, the chassis 3, the fulcrum for rotation 31, the chassis 4, the fulcrum for rotation 41, the lock mechanism 5, a paper feeding roller 6, a paper separating roller 7, a frame component 8, a paper discharging roller 9 and a pinch roller 10. Moreover, the paper automatic-feeding apparatus includes the paper feeding path 11 and a paper feeding path 12. The manuscript passes through the paper feeding path 11 when the paper automatic-feeding apparatus discharges the manuscript and turns the manuscript inside out. Meanwhile, the manuscript passes through the paper feeding path 12 when the paper automatic-feeding apparatus feeds the manuscript.

The chassis 2 is mounted on the frame component 8. Moreover, the chassis 2 can be opened and closed through being rotated around the fulcrum for rotation 21 which is a contact point with the frame component 8. Moreover, the chassis 2 forms a part of the paper feeding path 12 (hereinafter, referred to as an upper plate of the paper feeding path 12 in some cases).

The paper feeding path 12 (specifically, the chassis 3 which forms a part of the paper feeding path 12) is exposed through the chassis 2 being rotated counterclockwise around the fulcrum for rotation 21. Hereinafter, a state that the chassis 2 forms a part of the paper feeding path 12 is called a state of closing the chassis 2, and a state that the chassis 2 makes the paper feeding path exposed is called a state of opening the chassis 2. In the state of opening the chassis 2, user can remove a paper which is jammed at a visible place from the paper feeding path 12.

The chassis 3 is mounted on the frame component 8. Moreover, the chassis 3 can be opened and closed through being rotated around the fulcrum for rotation 31 which is a contact point with the frame component 8. Moreover, the chassis 3 forms a part of the paper feeding path 12 (hereinafter, referred to as a lower plate of the paper feeding path 12 in some cases).

The chassis 4 is exposed through the chassis 3 being rotated clockwise around the fulcrum for rotation 31. Hereinafter, a state that the chassis 4 is not exposed is called a state of closing the chassis 3, and a state that the chassis 4 is exposed is called a state of opening the chassis 3.

The chassis 4 is mounted on the frame component 8. Moreover, the chassis 4 can be opened and closed through being rotated around the fulcrum for rotation 41 which is a contact point with the frame component 8. Moreover, the chassis 4 forms a part of the paper feeding path 11 (hereinafter, referred to as an upper plate of the paper feeding path 11 in some cases).

The paper feeding path 11 (specifically, a lower plate of the paper feeding path 11) is exposed through the chassis 4 being rotated counterclockwise around the fulcrum for rotation 41. Hereinafter, a state that the chassis 4 forms a part of the paper feeding path 11 is called a state of closing the chassis 4, and a state that the chassis 4 makes the paper feeding path 11 exposed is called a state of opening the chassis 4. In the state of opening the chassis 4, user can remove a paper which is jammed at a visible place from the paper feeding path 11.

The example of the configuration, which includes the chassis 4, is described in the exemplary embodiment. In the case that it is possible to remove the jammed paper with no use of the chassis 4, the chassis 4 may not be always included in the configuration. It may be preferable, for example, to adopt a configuration that the chassis 3 forms the upper plate of the paper feeding path 11 and the paper feeding path 11 is exposed through opening the chassis 3.

The lock mechanism 5, which is mounted on the chassis 2, is used to fix the chassis 2, the chassis 3 and the chassis 4 when the paper automatic-feeding apparatus works. The lock mechanism 5 fixes the chassis 2, the chassis 3 and the chassis 4, for example, through being hooked onto the fulcrum for rotation 31 of the chassis 3. Specifically, the lock mechanism 5, which is formed in a hook shape, fixes the chassis 3, the chassis 4 and the chassis 5 through being hooked onto the fulcrum for rotation 31 of the chassis 3.

The paper feeding roller 6, which is mounted on the chassis 2, is used to send the manuscript into the apparatus. The paper separating roller 7, which is mounted on the chassis 3, is used to separate the manuscript in cooperation with the paper feeding roller 6.

The paper discharging roller 9, which is mounted on the frame component 8, is used to discharge the manuscript and to turn the manuscript inside out. The pinch roller 10, which is mounted on the chassis 3, is used in cooperation with the paper discharging roller 9.

Next, an operation, which the apparatus carries out at a time of removing the jammed paper, will be described with reference to FIG. 4 and FIG. 5. FIG. 5 is an explanatory diagram showing a state that each chassis is opened in order to remove the jammed paper in the paper automatic-feeding apparatus.

It is assumed in an example shown in FIG. 4 that a paper is jammed on the paper feeding path 11. In the case, user unlocks the lock mechanism 5 firstly. Specifically, user moves the lock mechanism 5 so that the lock mechanism 5 may be taken out from the state that the lock mechanism 5 is hooked onto the fulcrum for rotation 31.

Next, user makes the chassis 2 enter into the opened state through rotating the chassis 2 counterclockwise around the fulcrum for the rotation 21, and consequently, makes the paper feeding path 12 (specifically, the chassis 3 which forms the lower plate of the paper feeding path 12) exposed.

Next, user makes the chassis 3 enter into the opened state through rotating the chassis 3 clockwise around the fulcrum for the rotation 31, and consequently, makes the chassis 4 exposed.

Next, user makes the chassis 4 enter into the opened state through rotating the chassis 4 counterclockwise around the fulcrum for the rotation 41, and consequently, makes the paper feeding path 11 (specifically, the lower plate of the paper feeding path 11) exposed.

It is possible to remove the jammed paper since the paper feeding path 11 enters into the exposed state by the above mentioned operation.

According to the exemplary embodiment, the bearing part of the lock mechanism 5 and the fulcrum for rotation 31 composes unified structure as mentioned above. Therefore, it is possible to save a space with holding both the mechanism for removing the jammed paper and the lock mechanism.

While the example of using the paper separating roller is described according to the exemplary embodiment, it is not always necessary to use the paper separating roller. It may be preferable, for example, that a paper separating board, which is made of a rubber board or the like, realizes the same function.

Moreover, while the apparatus, which reads both sides of the manuscript, is described according to the exemplary embodiment, the present invention is applicable to an apparatus which can read only one side of the manuscript.

Moreover, while the paper (manuscript) automatic-feeding apparatus, with which a reading apparatus is equipped, is described according to the exemplary embodiment, the present invention is not limited to the paper (manuscript) automatic-feeding apparatus. The present invention is also applicable to a recording paper automatic-feeding apparatus with which a recording apparatus is equipped.

Moreover, while the lock mechanism 5 is formed in the hook shape, and fixes each chassis through the lock mechanism 5 being hooked onto the fulcrum for rotation 31, the present invention is not limited to the method for fixation. It may be preferable, for example, that the lock mechanism 5 has a projecting part and fixes each chassis through fitting the projecting part into a concave part of the fulcrum for rotation 31.

The characteristic configurations of the paper automatic-feeding apparatus, which are shown in the following (1) to (5), are described in the exemplary embodiment.

(1) The paper automatic-feeding apparatus is characterized in that:
the paper automatic-feeding apparatus includes:
a first paper feeding path (for example, paper feeding path 12) through which a paper medium passes;
a second paper feeding path (for example, paper feeding path 11) which is arranged separately from the first paper feeding path and through which a paper medium passes;
a first fulcrum part (for example, fulcrum for rotation 21) to support a first chassis (for example, chassis 2), which forms at least a part of the first paper feeding path, as a bearing so that the first chassis can be opened and closed;
a second fulcrum part (for example, fulcrum for rotation 31) to support a second chassis (for example, chassis 3), which forms at least a part of the second paper feeding path, as a bearing so that the second chassis can be opened and closed;
a fixation part (for example, lock mechanism 5) to fix the first chassis and the second chassis so that the first chassis and the second chassis may be in the closed state through the fixation part being fixed on a predetermined fixed part; and
the predetermined fixed part and the second fulcrum for rotation are formed as a common part.

(2) It may be preferable in the paper automatic-feeding apparatus that the fixation part is mounted on the first chassis and fixes the first chassis and the second chassis so that the first chassis and the second chassis may be in the closed state through the fixation part being fixed on the predetermined fixed part which is formed as the common part to the second fulcrum.

(3) It may be preferable in the paper automatic-feeding apparatus that the first fulcrum part supports the first chassis, which forms the upper plate of the first paper feeding path through which a paper medium passes, as the bearing so that the first chassis can be opened and closed when the paper is fed into a paper medium reading part, and
the second fulcrum part forms the lower plate of the first paper feeding path, and supports the second chassis, which forms the upper plate of the second paper feeding path through which a paper medium read by a paper reading part passes in order that the read paper may be turned inside out, as a bearing so that the second chassis can be opened and closed.

(4) It may be preferable in the paper automatic-feeding apparatus that the fixation part is formed in the hook shape and fixes the first chassis and the second chassis so that the first chassis and the second chassis may be in the closed state through the fixation part being hooked onto the second fulcrum part.

(5) It may be preferable in the paper automatic-feeding apparatus that the second fulcrum part has a predetermined concave part, and the fixation part, which has a projecting part, fixes the first chassis and the second chassis so that the first chassis and the second chassis may be in the closed state through fitting the projecting part into the concave part.

The present invention is applicable to the paper automatic-feeding apparatus with which the copying machine, the facsimile apparatus, the scanner apparatus or the like is equipped.

According to the present invention, it is possible that the paper automatic-feeding apparatus realizes to save a space furthermore with holding the mechanism which is necessary to remove the jammed paper.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:
1. A paper automatic-feeding apparatus, comprising:
a first paper feeding path through which a paper medium passes;
a second paper feeding path which is arranged separately from the first paper feeding path and through which a paper medium passes;
a first fulcrum part to support a first chassis, which forms at least a part of the first paper feeding path, as a bearing so that the first chassis can be opened and closed;
a second fulcrum part to support a second chassis, which forms at least a part of the second paper feeding path, as a bearing so that the second chassis can be opened and closed; and
a fixation part to fix the first chassis and the second chassis so that the first chassis and the second chassis may be in a closed state through the fixation part being fixed on a predetermined fixed part; wherein
the predetermined fixed part and the second fulcrum part are formed as a common part;
the first fulcrum part supports the first chassis, which forms an upper plate of the first paper feeding path through which a paper medium passes, as a bearing so that the first chassis can be opened and closed when a paper is fed into a paper medium reading part; and the second fulcrum part forms a lower plate of the first paper feeding path, and supports the second chassis, which forms an upper plate of the second paper feeding path through which a paper medium read by a paper reading part passes in order that the read paper may be turned inside out, as a bearing so that the second chassis can be opened and closed.

2. The paper automatic-feeding apparatus according to claim 1, wherein the fixation part is mounted on the first chassis and fixes the first chassis and the second chassis so that the first chassis and the second chassis may be in the closed state through the fixation part being fixed onto the fixed part which is formed as the common part to the second fulcrum part.

3. The paper automatic-feeding apparatus according to claim 1, wherein
the fixation part is formed in a hook shape and fixes the first chassis and the second chassis so that the first chassis and the second chassis may be in the closed state through the fixation part being hooked on the second fulcrum part.

4. The paper automatic-feeding apparatus according to claim 1, wherein
the second fulcrum part has a predetermined concave part; and
the fixation part has a projecting shape and fixes the first chassis and the second chassis so that the first chassis and the second chassis may be in the closed state through the projecting part being fitted into the concave part.

5. A copying machine, comprising:
a first paper feeding path through which a paper medium passes;
a second paper feeding path which is arranged separately from the first paper feeding path and through which a paper medium passes;
a first fulcrum part to support a first chassis, which forms at least a part of the first paper feeding path, as a bearing so that the first chassis can be opened and closed;
a second fulcrum part to support a second chassis, which forms at least a part of the second paper feeding path, as a bearing so that the second chassis can be opened and closed; and
a fixation part to fix the first chassis and the second chassis so that the first chassis and the second chassis may be in a closed state through the fixation part being fixed on a predetermined fixed part; wherein the predetermined fixed part and the second fulcrum part are formed as a common part;

the first fulcrum part supports the first chassis, which forms an upper plate of the first paper feeding path through which a paper medium passes, as a bearing so that the first chassis can be opened and closed when a paper is fed into a paper medium reading part; and the second fulcrum part forms a lower plate of the first paper feeding path, and supports the second chassis, which forms an upper plate of the second paper feeding path through paper medium read by a paper reading part passes in order that the read paper may be turned inside out, as a bearing so that the second chassis can be opened and closed.

6. Facsimile apparatus, comprising:
a first paper feeding path through which a paper medium passes;
a second paper feeding path which is arranged separately from the first paper feeding path and through which a paper medium passes;
a first fulcrum part to support a first chassis, which forms at least a part of the first paper feeding path, as a bearing so that the first chassis can be opened and closed;
a second fulcrum part to support a second chassis, which forms at least a part of the second paper feeding path, as a bearing so that the second chassis can be opened and closed; and
a fixation part to fix the first chassis and the second chassis so that the first chassis and the second chassis may be in a closed state through the fixation part being fixed on a predetermined fixed part; wherein the predetermined fixed part and the second fulcrum part are formed as a common part;

the first fulcrum part supports the first chassis, which forms an upper plate of the first paper feeding path through which a paper medium passes, as a bearing so that the first chassis can be opened and closed when a paper is fed into a paper medium reading part; and the second fulcrum part forms a lower plate of the first paper feeding path, and supports the second chassis, which forms an upper plate of the second paper feeding path through paper medium read by a paper reading part passes in order that the read paper may be turned inside out, as a bearing so that the second chassis can be opened and closed.

* * * * *